US012134201B2

(12) United States Patent
Iaccarino et al.

(10) Patent No.: US 12,134,201 B2
(45) Date of Patent: Nov. 5, 2024

(54) HAIR CUTTING SYSTEM

(71) Applicant: KONINKLIJKE PHILIPS N.V., Eindhoven (NL)

(72) Inventors: Luca Iaccarino, Groningen (NL); Madhusudhan Varma Amaravathi, Hyerabad (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 84 days.

(21) Appl. No.: 17/050,613

(22) PCT Filed: Apr. 30, 2019

(86) PCT No.: PCT/EP2019/060994

§ 371 (c)(1),
(2) Date: Oct. 26, 2020

(87) PCT Pub. No.: WO2019/211256

PCT Pub. Date: Nov. 7, 2019

(65) Prior Publication Data

US 2021/0122070 A1 Apr. 29, 2021

(30) Foreign Application Priority Data

May 2, 2018 (WO) ................ PCT/CN2018/085338
Jul. 12, 2018 (EP) ..................................... 18183076

(51) Int. Cl.
*B26B 19/38* (2006.01)
*B26B 19/20* (2006.01)

(52) U.S. Cl.
CPC .......... *B26B 19/3813* (2013.01); *B26B 19/20* (2013.01)

(58) Field of Classification Search
CPC . B26B 19/38; B26B 19/3806; B26B 19/3813; B26B 19/382
(Continued)

(56) References Cited

U.S. PATENT DOCUMENTS 621,439 A 3/1899 Watson
2,276,886 A * 3/1942 Smith .................... A45D 24/32 15/402
(Continued)

FOREIGN PATENT DOCUMENTS

EP 1547736 6/2005
FR 2809049 11/2001
(Continued)

OTHER PUBLICATIONS

International Search Report and Written Opinion Dated Jul. 22, 2019 for International Application No. PCT/EP2019/060994 Filed Apr. 30, 2019.

*Primary Examiner* — Adam J Eiseman
*Assistant Examiner* — Richard D Crosby, Jr.

(57) ABSTRACT

A hair cutting system (100) is provided, the system comprising a hair cutting appliance (120) comprising one or more pairs of cutting blades (124) for cutting hair a comb (140) arranged forwards of the cutting blades and configured to guide hair towards the cutting blades; and a hair collector (160), the hair collector comprising a hair chamber (168) for receiving hair cut by the hair cutting appliance and a coupling portion (170) configured to couple the hair collector to the hair cutting appliance. A hair collector for the hair cutting system is also provided.

13 Claims, 10 Drawing Sheets

(58) Field of Classification Search
USPC ................................ 30/194–210, 233, 233.5
See application file for complete search history.

(56) References Cited

U.S. PATENT DOCUMENTS

| | | | | | |
|---|---|---|---|---|---|
| 3,344,520 | A * | 10/1967 | Williams | B26B 19/20 | 30/200 |
| 4,216,581 | A * | 8/1980 | Van Slooten | B26B 19/42 | 30/133 |
| 4,557,050 | A * | 12/1985 | Haraguchi | B26B 19/20 | 30/195 |
| 4,614,036 | A * | 9/1986 | Haraguchi | B26B 19/205 | 30/200 |
| 4,972,584 | A * | 11/1990 | Baumann | B26B 19/44 | 30/201 |
| 5,050,304 | A * | 9/1991 | Fujikawa | B26B 19/06 | 30/196 |
| 5,060,380 | A * | 10/1991 | Fujikawa | B26B 19/16 | 30/200 |
| 5,123,159 | A * | 6/1992 | Kubo | B26B 19/22 | 30/196 |
| 5,185,931 | A * | 2/1993 | Fujikawa | B26B 19/20 | 30/195 |
| 5,237,750 | A * | 8/1993 | Nakano | B26B 19/20 | 30/131 |
| 5,377,411 | A * | 1/1995 | Andriotis | B26B 19/44 | 30/133 |
| 6,571,478 | B1 * | 6/2003 | Romani | B26B 19/44 | 30/132 |
| 6,604,287 | B2 * | 8/2003 | Melton | B26B 19/06 | 30/122 |
| 6,665,938 | B2 * | 12/2003 | McCambridge | B26B 19/20 | 30/133 |
| 6,684,511 | B2 * | 2/2004 | McCambridge | B26B 19/063 | 30/133 |
| 8,484,853 | B1 * | 7/2013 | Laube | B26B 19/44 | 30/133 |
| 9,073,225 | B2 * | 7/2015 | Chen | B26B 13/24 | |
| 9,919,439 | B2 * | 3/2018 | Fu | B26B 19/44 | |
| 10,124,496 | B2 * | 11/2018 | Nab | B26B 19/3813 | |
| 10,843,353 | B2 * | 11/2020 | Phoon | B26B 19/06 | |
| 10,864,645 | B2 * | 12/2020 | Magrone | B26B 19/44 | |
| 11,230,022 | B2 * | 1/2022 | Halmut | B26B 19/20 | |
| 2004/0045168 | A1 * | 3/2004 | Talavera | B26B 19/3813 | 30/133 |
| 2005/0138817 | A1 * | 6/2005 | Yamaguchi | B26B 19/20 | 30/233 |
| 2006/0174487 | A1 * | 8/2006 | Andis | B26B 19/20 | 30/34.05 |
| 2006/0230619 | A1 * | 10/2006 | Williams | B26B 19/44 | 30/133 |
| 2007/0214653 | A1 | 9/2007 | Worgull | | |
| 2010/0011585 | A1 * | 1/2010 | Maichel | B26B 21/40 | 30/34.1 |
| 2011/0308087 | A1 * | 12/2011 | Rehbein | B26B 19/3886 | 30/34.1 |
| 2014/0215832 | A1 * | 8/2014 | Julemont | A45D 24/36 | 30/200 |
| 2017/0057104 | A1 | 3/2017 | Nab | | |
| 2017/0361476 | A1 * | 12/2017 | Phoon | B26B 19/20 | |
| 2018/0222068 | A1 * | 8/2018 | Halmut | B26B 19/44 | |
| 2018/0281214 | A1 * | 10/2018 | Snow | B26B 19/3886 | |
| 2018/0333876 | A1 * | 11/2018 | Darwinkel, I | B26B 19/3853 | |
| 2018/0345510 | A1 * | 12/2018 | Julemont | B26B 19/44 | |
| 2020/0094425 | A1 * | 3/2020 | Iaccarino | B26B 19/20 | |
| 2020/0238547 | A1 | 7/2020 | Iaccarino | | |

FOREIGN PATENT DOCUMENTS

| | | | | |
|---|---|---|---|---|
| JP | 2005270193 A | | 10/2005 | |
| WO | 2017/021202 | | 2/2017 | |
| WO | WO-2017021202 A1 | * | 2/2017 | B26B 19/44 |
| WO | 2017/084897 | | 5/2017 | |

* cited by examiner

HAIR CUTTING SYSTEM

CROSS REFERENCE TO RELATED APPLICATIONS

This application is the U.S. National Phase application under 35 U.S.C. § 371 of International Application No. PCT/EP2019/060994 filed Apr. 30, 2019, which claims the benefit of European Patent Application Number 18183076.1 filed Jul. 12, 2018 and Patent Application Number PCT/CN2018/085338 filed May 2, 2018. These applications are hereby incorporated by reference herein.

FIELD OF THE INVENTION

The present disclosure relates to a hair cutting system and is particularly, although not exclusively, concerned with a hair cutting system that improves the capturing of cut hairs.

BACKGROUND OF THE INVENTION

During hair trimming, cut hairs are typically allowed to fall away from a hair cutting apparatus on to and around the person whose hair is being cut. This can cause annoyance to both the one giving and the one receiving a haircut.

Cleaning up hairs after a haircut requires time and effort. Additionally, cut hairs that fall on the skin, e.g. of the neck, face, back, arms and/or hands, during the haircut can cause itchiness and irritation, which can make the hair cutting process uncomfortable.

It is particularly desirable for the hair cutting process to be made as comfortable as possible when a child is being given a haircut. Cut hairs on the child's skin can cause itchiness and irritation, adding to the concerns of the person giving the haircut and possibly leading to poor haircut results.

Published patent application WO 2017/084897 A1 discloses a hair clipping system comprising a hair clipper, a distancing comb and a hair collection container, the hair collection container being arranged to be placed between the comb and the clipper.

Published patent application WO 2017/021202 A1 discloses a hair clipping system comprising a hair clipper, a distancing comb and a hair collection container, the hair collection container being arranged to attach to the comb. In the attached state, the hair collection container extends between the comb and the clipper as well as behind the comb.

Published patent application FR 2 809 049 A1 discloses a hair clipping device having an air blowing arrangement for blowing cut hair particles into a recipient container at some distance of the device.

SUMMARY OF THE INVENTION

According to an aspect of the present disclosure, there is provided a hair cutting system comprising: a hair cutting appliance comprising one or more pairs of cutting blades for cutting hair; a comb arranged forwards of the cutting blades, e.g. as seen in the direction of movement (the cutting direction) of the hair cutting appliance, and configured to guide hair towards the cutting blades; and a hair collector, the hair collector comprising a hair chamber for receiving hairs cut by the hair cutting appliance and a coupling portion configured to couple the hair collector to the hair cutting appliance.

The comb and the hair collector is configured such that, when the hair cutting system is assembled, a portion of the comb, e.g. a distal portion of the comb, is arranged within the hair chamber.

A wall of the hair chamber, e.g. a front wall of the hair chamber, may extend, e.g. from the hair cutting appliance, over and forwards, e.g. in the cutting direction, of the distal end of the comb, e.g. an end of the comb furthest from the hair cutting appliance along the comb.

The wall of the hair chamber, e.g. the front wall of the hair chamber, may comprise an aperture. The comb may be configured such that a distal end of the comb extends into or through the aperture, e.g. when the hair cutting system is assembled.

An opening of the hair chamber for receiving hair may be substantially covered by the comb or the cutting blades and the comb, e.g. such that hair leaving the hair chamber passes through the cutting blades or the comb.

The comb may comprise a plurality of comb teeth. The comb teeth may be spaced laterally across the comb, e.g. perpendicular to the cutting direction. A spacing between the comb teeth may be approximately 3.8 mm, e.g. in order to restrict hairs from passing out of the hair chamber between the teeth of the comb. The spacing between the comb teeth may be less than or equal to 6.8 mm, less than or equal to 6 mm, less than or equal to 5 mm, less than or equal to 4 mm or less than or equal to 3 mm. The spacing between the comb teeth may be greater than or equal to 1 mm, greater than or equal to 2 mm, or greater than or equal to 3 mm.

The spacing between the comb teeth may be between approximately 3.8 mm and approximately 6.8 mm, e.g. less than or equal to 6.8 mm and greater than or equal to 3.8 mm. In some arrangements, the spacing between the comb teeth may be between approximately 1 mm and 6.8 mm, e.g. greater than or equal to 1 mm and less than or equal to 6.8 mm. Alternatively, the spacing between the comb teeth may be between approximately 1 mm and 3.8 mm, e.g. greater than or equal to 1 mm and less than or equal to 3.8 mm.

The hair collector may comprise a base wall configured to engage, or be aligned, with a surface of a body of the hair cutting appliance when the hair collector is coupled to the hair cutting appliance. A free edge of the base wall may at least partially define an opening of the hair chamber.

The hair cutting appliance may comprise a recess configured to receive at least a portion of the base wall of the hair collector.

An inside, e.g. interior, surface of the base wall may be oriented substantially perpendicularly to a hair cutting plane of the hair cutting appliance, e.g. a plane in which hair are cut by the cutting blades of the hair cutting appliance, at the free edge, e.g. at the opening of the hair collector. The inside surface of the base wall may be substantially aligned with the surface of the body of the hair cutting apparatus at a position away from the free edge. The base wall may comprise a corner portion at which the orientation of the inside surface of the base wall changes.

The base wall may comprise a curved wall portion. The orientation of the base wall, e.g. the inside surface of the base wall, may transition over the curved wall portion from being substantially perpendicular to the hair cutting plane at the edge to being substantially aligned with the surface of the hair cutting appliance body away from the free edge.

The base wall may comprise a ramped portion extended from the free edge, e.g. in to the hair chamber. The ramped portion may define a hair flow surface substantially perpendicular to the hair cutting plane of the cutting blades. The thickness of the base wall may change over the ramped portion from an edge thickness at the free edge to a wall thickness away from the free edge. The edge thickness may be less that the wall thickness.

The base wall may comprise a wall portion on an opposite side of the ramped portion to the free edge. The wall portion may be substantially aligned, or engaged, with the surface of the body of the hair cutting appliance.

The wall portion may be at a lower angle relative to the hair cutting plane, e.g. less perpendicular to the hair cutting plane, compared to the hair flow surface.

In other words the base wall of the hair collector may comprise a first angled portion adjacent the free edge and a second angled portion on an opposite side of the first angled portion to the edge, wherein the first angled portion, e.g. an inside surface of the first angled portion, may be angled more relative to the hair cutting plane of the hair cutting appliance, than the second angled portion. In other words, the first angled portion may be more perpendicular to the hair cutting plane that the second angled portion.

The cutting blades of the hair cutting appliance may extend from a distal end of the body of the hair cutting appliance. The free edge of the base wall may be substantially aligned with the distal end of the body of the hair cutting appliance, e.g. adjacent to the cutting blades. Hence, the opening of the hair chamber may be substantially aligned with the distal end of the body of the hair cutting appliance. The hair chamber may be enclosed on three or more sides of the chamber at the opening.

The comb may define a comb surface to be held against a user's skin when operating the hair cutting system. The comb surface may be selectively offset from the cutting blades by a hair cutting length, such that a length of hair cut by the hair cutting system is determined according to the hair cutting length.

The comb may be movable relative to the cutting blades, e.g. in a direction perpendicular to the cutting direction of the hair cutting appliance, in order to vary the length of hair cut by the hair cutting system. The comb and the hair collector may be configured such that a clearance between a distal end of the comb and an inside surface of the hair chamber is substantially constant as the comb moves. Alternatively, the clearance between the distal end of the comb and the inside surface of the hair chamber may vary, e.g. within a range of clearance values, as the comb moves.

The hair collector may further comprise a hair retaining wall between a closed end of the hair chamber and the opening of the hair chamber. The hair retaining wall may extend from the base wall into the hair chamber.

The hair retaining wall may extend away from the base wall in a direction substantially perpendicular to the hair cutting plane of the cutting blades or a cutting direction of the hair cutting appliance.

According to another aspect of the present disclosure, there is provided a hair collector for the above-mentioned hair cutting system, wherein the hair collector comprises a hair chamber for receiving hair cut by the hair cutting appliance and a coupling portion configured to couple the hair collector to the hair cutting appliance, such that a distal portion of the comb is arranged within the hair chamber.

According to another aspect of the present disclosure, there is provided a hair collector for the above-mentioned hair cutting system, wherein the hair collector comprises a hair chamber for receiving hair cut by the hair cutting appliance and a coupling portion configured to couple the hair collector to the hair cutting appliance, wherein, when the hair cutting system is assembled, a portion of the comb is to be arranged within the hair chamber.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION OF THE EMBODIMENTS

Figure 1:
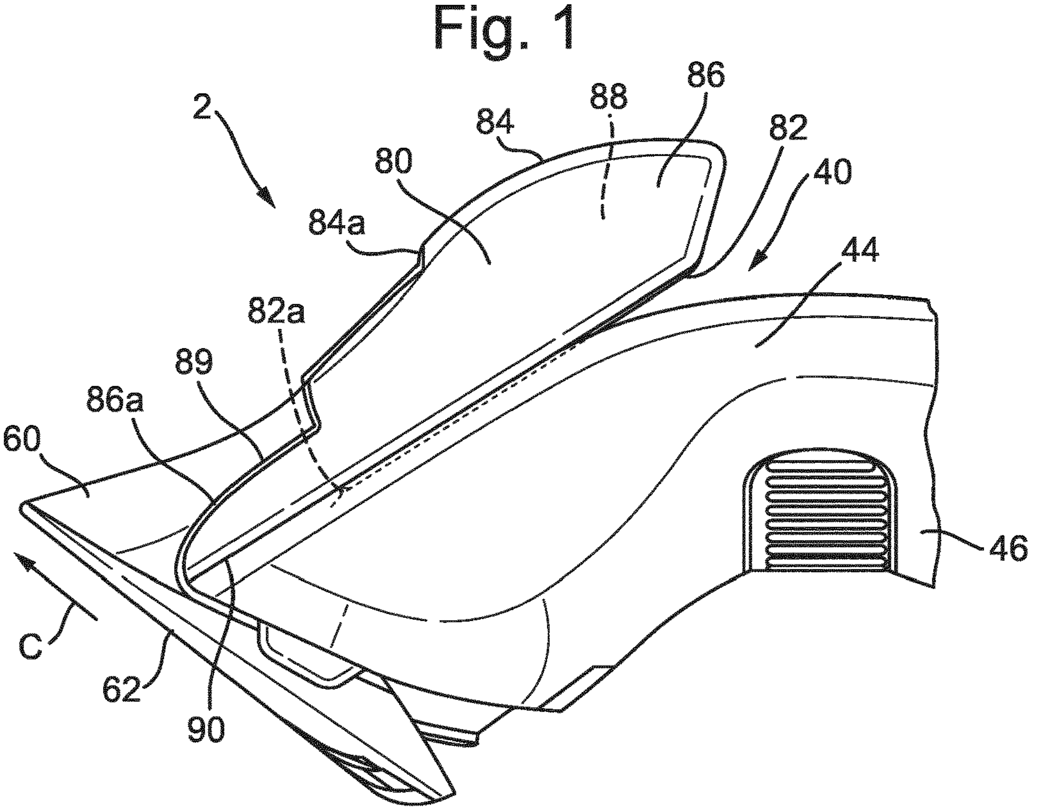
FIG. 1 is a side view of a previously proposed hair cutting system in a first hair cutting configuration.
Figure 2:
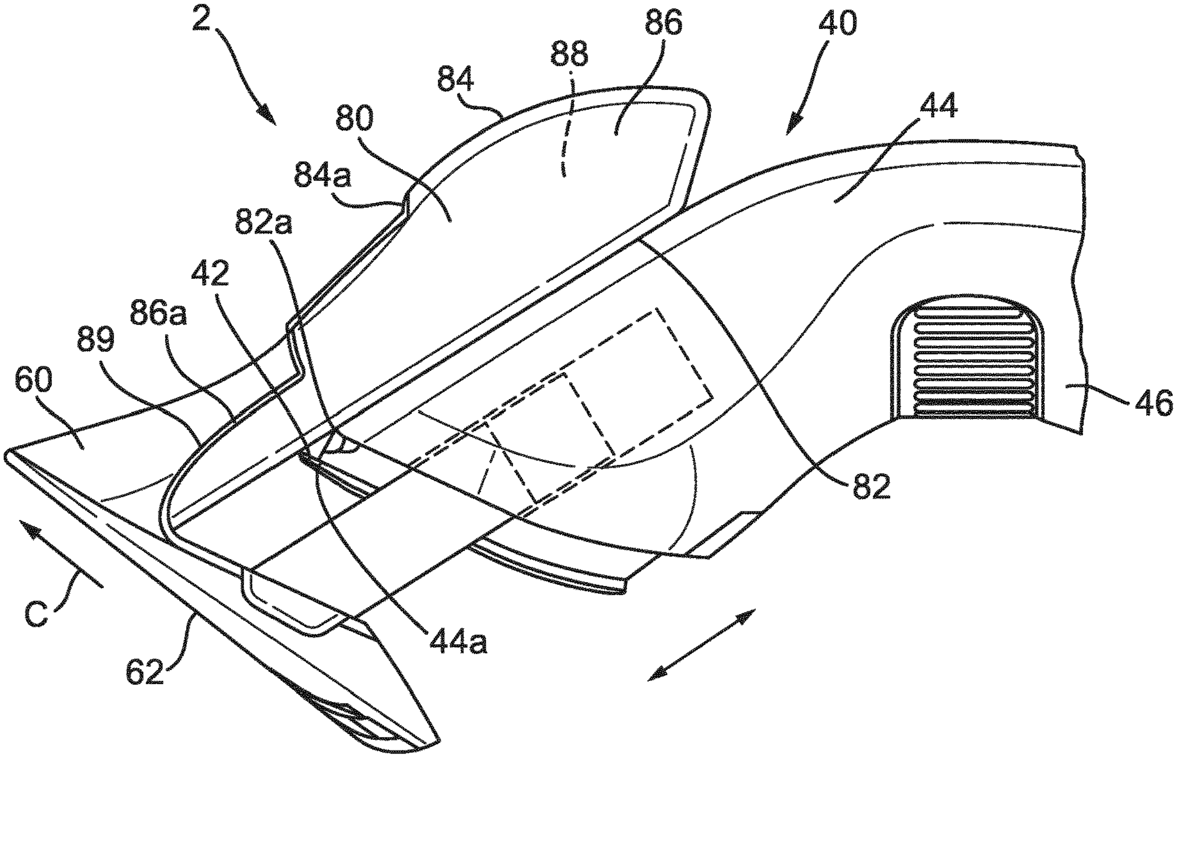
FIG. 2 is a side view of the previously proposed hair cutting system in a second hair cutting configuration.

With reference to FIGS. 1 and 2, a previously proposed hair cutting system 2 comprises a hair cutting appliance 40, a comb 60 configured to guide hair towards cutting blades 42 of the hair cutting appliance 40 to be cut, and a hair collector 80 for receiving and storing the hair cut by the hair cutting appliance 40.

The hair cutting appliance 40 comprises a body 44 including a grip portion 46 to be held by a user when the hair cutting system is in use. The cutting blades 42 may protrude from a distal end 44*a* of the body 44.

As depicted in FIG. 2, the hair cutting system 2 is adjustable such that the position of a comb surface 62 of the comb 60 can be adjusted relative to the body 44 of the hair cutting appliance 40 and the cutting blades 42.

In use, the comb surface 62 is held against the skin of the person whose hair is being cut and the hair cutting system 2 is moved over the person's skin in a cutting direction C, in order to cut the person's hair.

The length of hair cut by the hair cutting system 2 is controlled by adjusting the distance between the comb surface 62 of the comb 60 and the cutting blades 42 of the hair cutting appliance 40.

As shown in FIGS. 1 and 2, the hair collector 80 is coupled to the comb 60, such that the hair collector 80 moves together with the comb 60 as the position of the comb surface 62 is adjusted.

The hair collector 80 comprises a plurality of walls 82, 84, 86 which define a hair collection chamber 88 for receiving the cut hair. In particular, the hair collector 80 comprises a base wall 82 which is positioned adjacent to the body of the hair cutting appliance, a front wall 84 opposite the base wall 82 and two or more side walls 86 between the base wall 82 and the front wall 84. An opening 89 of the hair collection chamber 88 is defined by free edges 82*a*, 84*a*, 86*a* of the walls of the hair collector 82, 84, 86.

As depicted, when the hair collector 80 is coupled to the comb 60, part of the comb 60 is arranged over the opening 89 of the hair collection chamber 88 and acts to restrict hairs from leaving the hair collection chamber 88. Because the hair collector 80 is coupled to the comb and moves together with the comb 60, the comb 60 continues to restrict hairs from leaving the hair collection chamber 88 as the hair cutting length is adjusted.

As shown in FIG. 1, the free edge 82*a* of the base wall 82, which partially forms the opening 89 of the hair collection chamber 88, is offset from the distal end 44*a* of the body 44 of the hair cutting appliance, e.g. away from the comb surface 62, so that the base wall 82 does not interfere with the cutting blades 42 of the hair cutting appliance when the comb 60 is moved away from the hair cutting appliance 40 to adjust the hair cutting length, e.g. as shown in FIG. 2.

Because the free edge 82*a* of the base wall is offset from the distal end 44*a* of the body 44, a gap 90 may be present between the body 44 of the hair cutting appliance 40 and the side walls 86 of the hair collector 80, which may allow hairs to fall out of the hair collection chamber 88, particularly when the distance between the comb surface 62 and the cutting blades 42 is at a minimum, and the distance between the cutting blades 42 and the free edge 82*a* of the base wall is at a maximum, as depicted in FIG. 1.

Figure 3A:
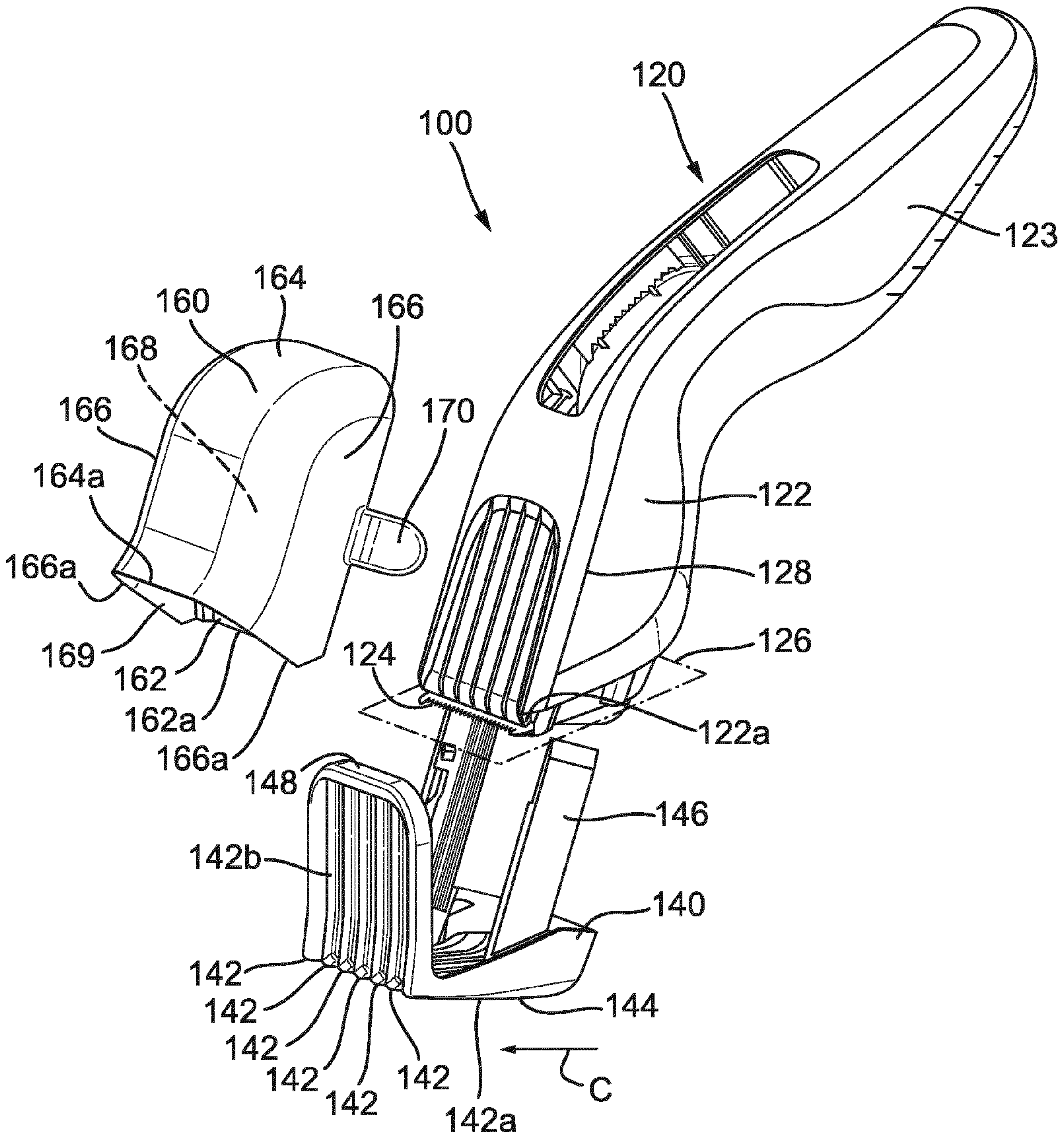
FIGS. 3*a* and 3*b* are perspective views of a hair cutting system, according to arrangements of the present disclosure, in disassembled and assembled conditions respectively.
Figure 3B:
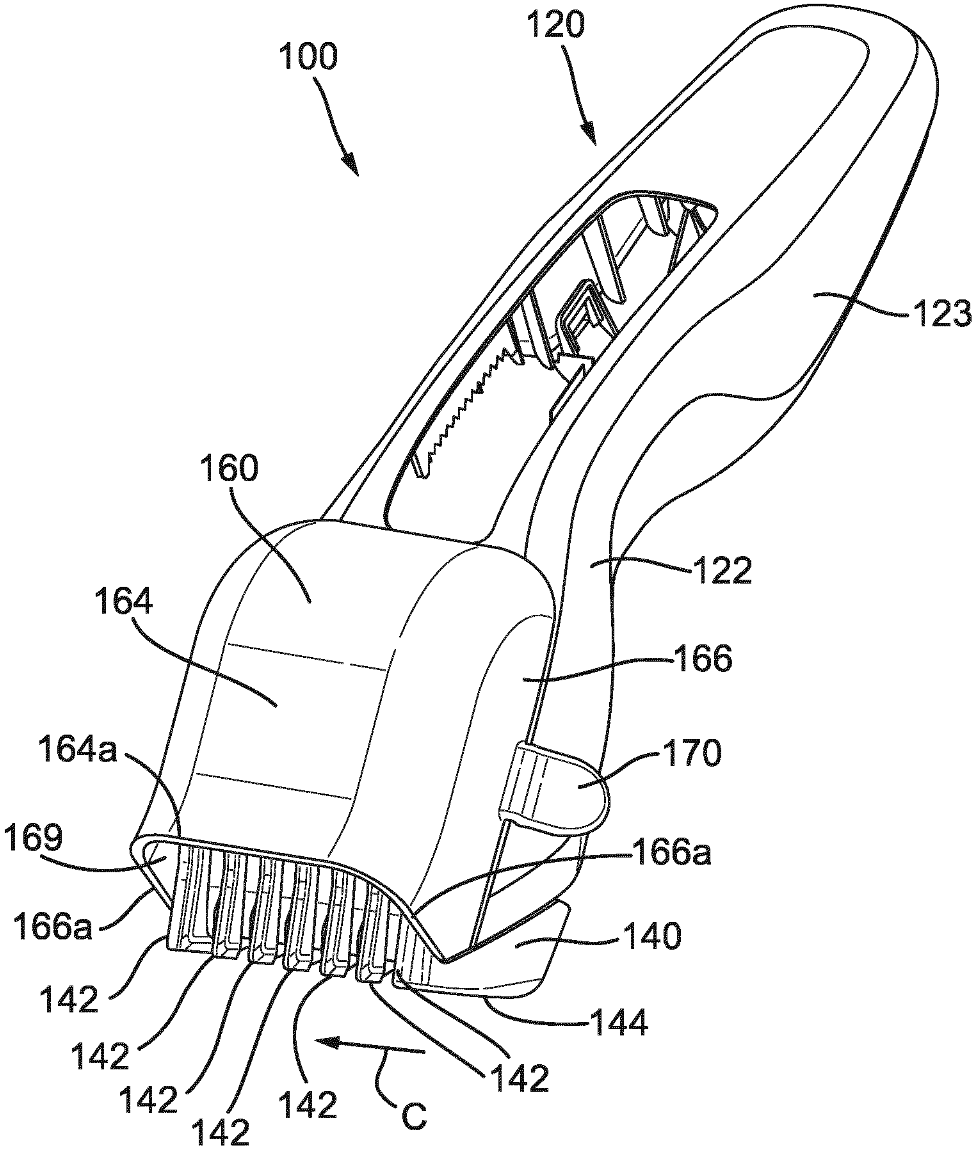

With reference to FIGS. 3*a* and 3*b*, a hair cutting system 100 according to arrangements of the present disclosure, comprises a hair cutting appliance 120, a comb 140 and a hair collector 160.

The hair cutting appliance 120 may be similar to the hair cutting appliance 40 and the features described above with reference to the hair cutting appliance 40 may apply equally to the hair cutting appliance 120.

The hair cutting appliance 120 comprises a body 122, having a grip portion 123, and cutting blades 124 for cutting hair. As depicted, the cutting blades 124 may protrude from a distal end 122*a* of the body 122.

The hair cutting appliance 120 may further comprise one or more coupling portions 128 configured to allow the hair collector 160 to be coupled to the hair cutting appliance 120, as described below.

In the arrangement shown, the cutting blades 124 comprise a pair of blades including a moving blade and a stationary blade (which may be referred to as a comb or guard blade). The moving and stationary blades each comprise a plurality of teeth, the teeth of the stationary blade corresponding to the teeth of the moving blade. The moving blade is driven by a motor of the hair cutting appliance to perform a reciprocating, oscillating or rotating motion relative to the stationary blade, opening and closing gaps between the respective corresponding teeth of the moving and stationary blades. When the gaps are open, hairs can be received between the teeth and the hairs are then cut when the gaps are closed. In some arrangements, the teeth of both the moving and stationary blades may comprise sharpened edges. Alternatively, the teeth of the moving or of the stationary blade may not be sharpened and the hairs may be cut by the action of the sharpened blade over the blunt edge of the unsharpened blade. The cutting blades 124 are arranged to cut hair in a cutting plane 126 defined by the cutting blades. The present disclosure may also apply to hair cutting appliances comprising different arrangements of cutting blades or other cutting elements for cutting a person's hair.

The comb 140 comprises a plurality comb teeth 142 spaced laterally across the comb 140, e.g. in a direction parallel to the cutting plane 126 and perpendicular to the cutting direction C. The comb teeth 142 are shaped and arranged to lift hair away from the skin and guide the hair towards the cutting blades 124 as the hair cutting system 100 is moved in a cutting direction C, e.g. so that the hair can be more easily received in the gaps between the moving and stationary blades.

The comb 140 defines a comb surface 144 that is rested against the skin of the person whose hair is being cut when the hair cutting system 100 is in use. As described above, the length to which hair is cut by the hair cutting system is determined according to the distance between the comb surface 144 and the cutting blades 124.

Figure 4:
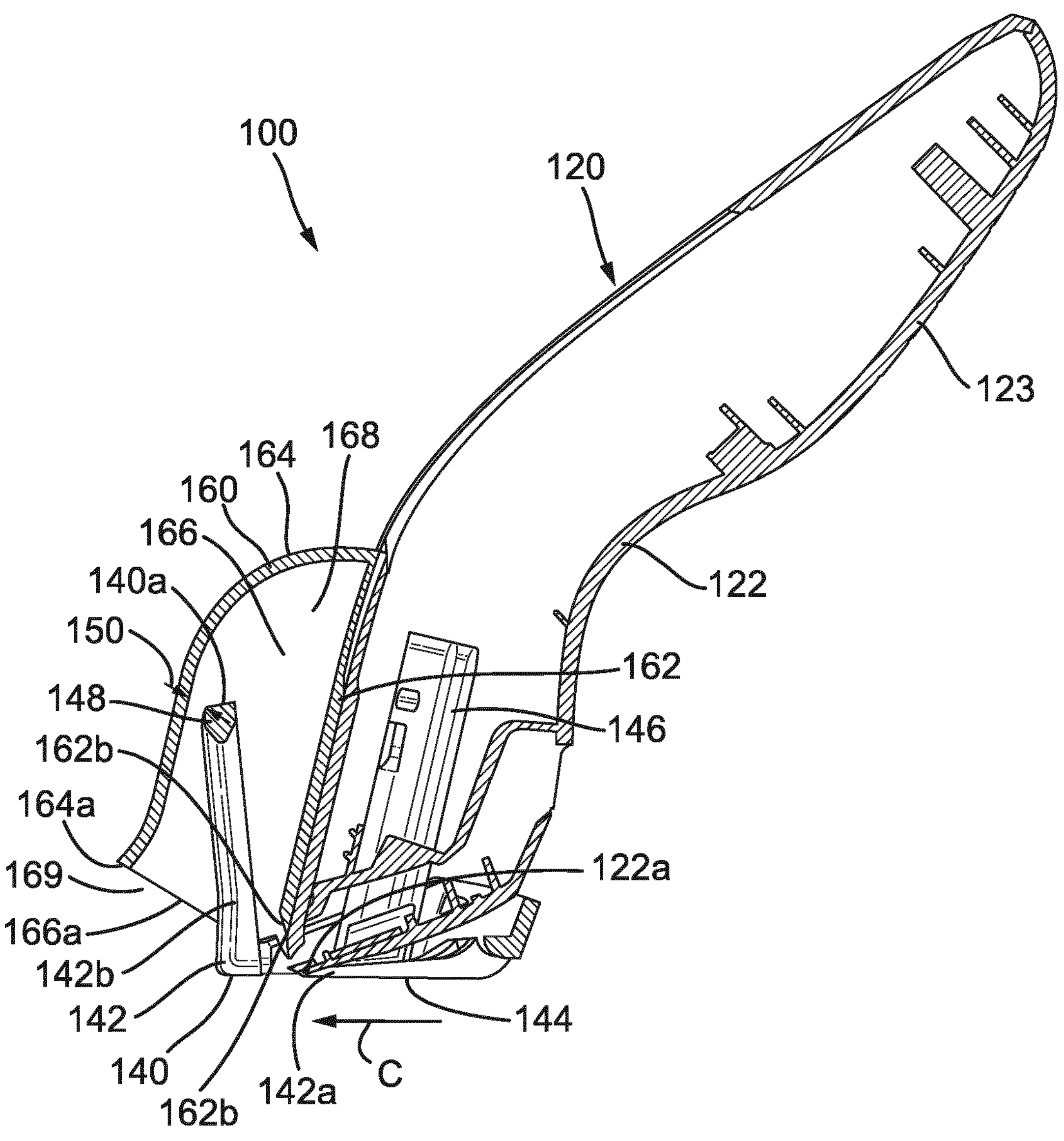
FIG. 4 is a sectional side view of the hair cutting system in a first hair cutting configuration.
Figure 5:
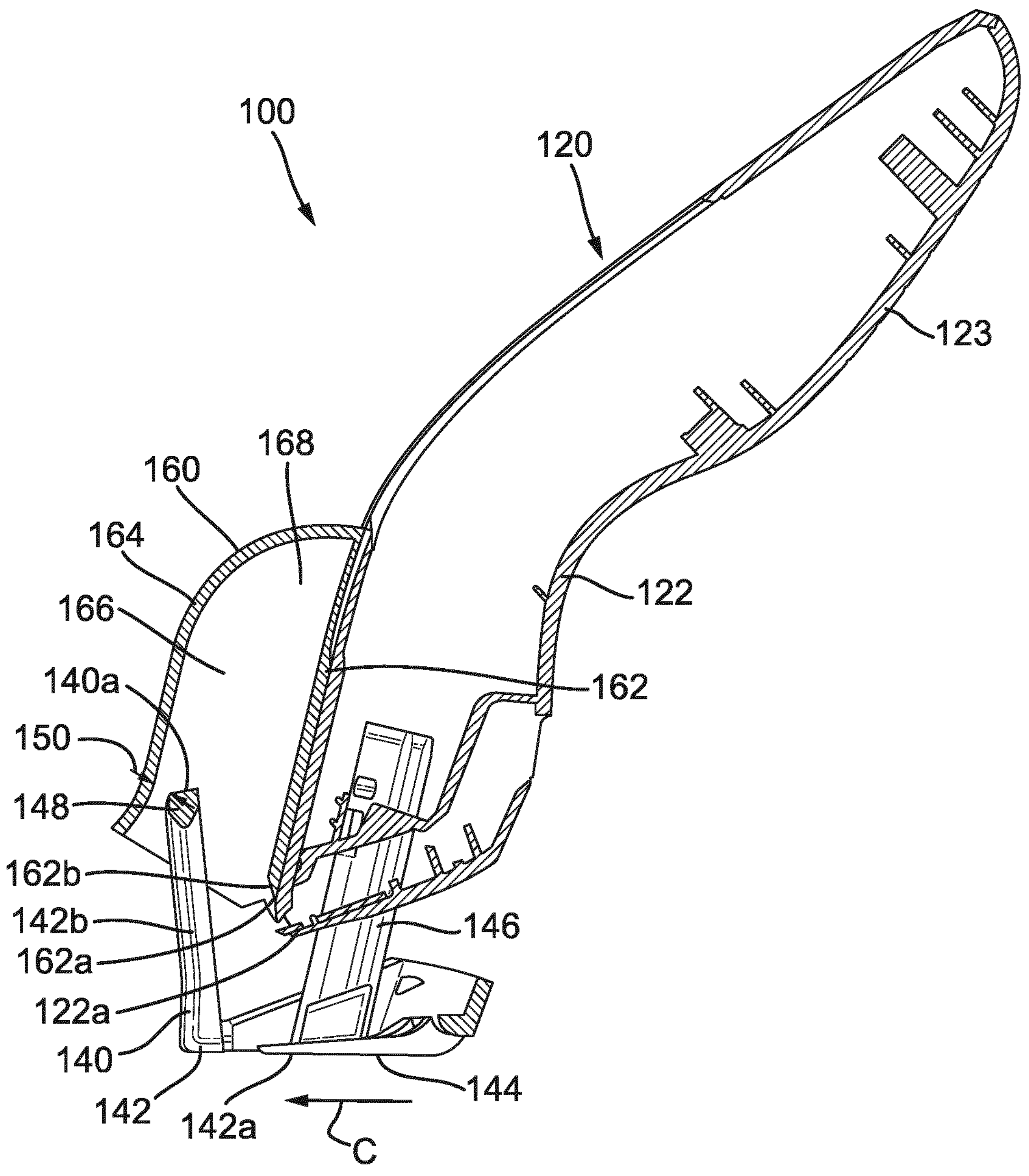
FIG. 5 is a sectional side view of the hair cutting system in a second hair cutting configuration.

The comb 140 comprises a coupling portion 146 configured to movably couple the comb 140 to the hair cutting appliance 120, to enable to comb 140 to be moved relative to hair cutting appliance to adjust the hair cutting length. The comb 140 may be movable relative to the hair cutting appliance 120 between a retracted position, as depicted in FIG. 4, and an extended position, as depicted in FIG. 5.

The comb teeth 142 comprise first portions 142*a* that extend from the coupling portion 146 in the cutting direction C. The comb surface 144 may be at least partially formed by the first portions 142*a* of the comb teeth, e.g. the lower surfaces of the first portions 142*a*. The comb teeth 142 further comprise second portions 142*b*, which extend from the respective first comb teeth portions 142*a* to a distal end 140*a* of the comb 140. As shown, the second portions 142*b* of the comb teeth may extend in a direction with a component perpendicular to the comb surface 144, e.g. away from the comb surface. For example, the second portions 142*b* of the comb teeth may extend in a direction substantially perpendicular to the comb surface 144.

The second portions 142*b* of the comb teeth may provide support for hairs that have been lifted away from the skin, as the hairs are guided towards the cutting blades 124. Additionally, the second portions 142*b* of the comb teeth may restrict hairs from falling out of the hair collector 160, as described below.

As depicted, the comb 140 may further comprise a connecting bar 148 provided at the distal end 140*a* of the comb 140. The connecting bar 148 may extend in the lateral direction of the comb. The connecting bar 148 may extend between two or more of the comb teeth 142 to connect the teeth together.

The hair collector 160 comprises a base wall 162, which is positioned adjacent to the body 122 of the hair cutting appliance 120 when the hair cutting system 100 is assembled. The hair collector 160 further comprises a front wall 164 opposite to the base wall 162 and two or more side walls 166 between the base wall 162 and the front wall 164. The walls 162, 164, 166 together define a hair collection chamber 168 for receiving hair cut by the hair cutting appliance 120.

An opening 169 of the hair collection chamber 168 is defined by free edges 162*a*, 164*a*, 166*a* of the walls of the hair collector. When the hair cutting system 100 is assembled, the opening 169 is arranged such that hair that is cut by the hair cutting appliance arrives at the opening 169 of the hair chamber. The opening 169 may be arranged adjacent to the cutting blades 124. The opening 169 may be defined on an opposite side of the cutting plane 126 to the comb surface 144.

Returning to FIGS. 3*a* and 3*b*, the hair collector 160 further comprises one or more coupling portions 170 configured to couple to the hair cutting appliance 120. The hair collector 160 may comprise a coupling portion 170 provided on each lateral side of the hair collector 160. The coupling portions 170 may extend from the side walls 166 of the hair collector 160, e.g. on each lateral side of the hair collector 160.

The coupling portions 128 of the hair cutting appliance 120 may be configured to couple with respective ones of the coupling portions 170 of the hair collector 160. The coupling portions 170 of the hair collector 160 and corresponding coupling portions 128 of the hair cutting appliance 120 may be couplable using a mechanical coupling method, such as clips, snap connectors, buttons or straps, or any other mechanical coupling method.

Additionally or alternatively, the coupling portions 170 of the hair collector 160 and corresponding coupling portions 128 of the hair cutting appliance 120 may be couplable using any other coupling method. For example, either or both of the coupling portions 170 and the corresponding coupling portions 128 may comprise magnets, and the hair collector 160 may be configured to couple to the hair cutting appliance using magnets.

As shown in FIGS. 4 and 5, because the hair collector 160 is coupled to the hair cutting appliance 120, the opening 169 of the hair collection chamber 168 remains in the same position relative to the cutting blades 124 of the hair cutting appliance 120 as the position of the comb 140 relative to the hair cutting appliance 120 is varied, e.g. in order to adjust the hair cutting length. The free edge 162*a* of the base wall is substantially aligned with the distal end of the body of the hair cutting appliance, such that the opening 169 remains stationary relative to the cutting blades 124, e.g. adjacent to the cutting blades 124, as the comb 140 moves relative to the hair cutting appliance 120. Furthermore, because the base wall 162 of the hair collector extends up to the distal end of the hair cutting appliance, no gap is present between the base wall 162 and the side walls 166 of the hair collector 160 adjacent to the cutting blades 124.

When the hair collector 160 is coupled to the hair cutting appliance 120, a portion of the comb 140 is arranged within the hair collection chamber 168. In the arrangement shown, the distal end 140*a* of the comb 140, e.g. the connecting bar 148 and part of the second portions of the teeth 142*b*, is arranged within the hair collection chamber 168. The comb 140 and the hair collector 160 are together configured such that the comb 140 acts to restrict hairs from leaving the hair collection chamber 168.

The opening 169 may be substantially covered by the comb, e.g. the comb teeth 142, so cut hair passes though the comb in order to leave the hair collection chamber 168 through the opening 169.

Figure 6:
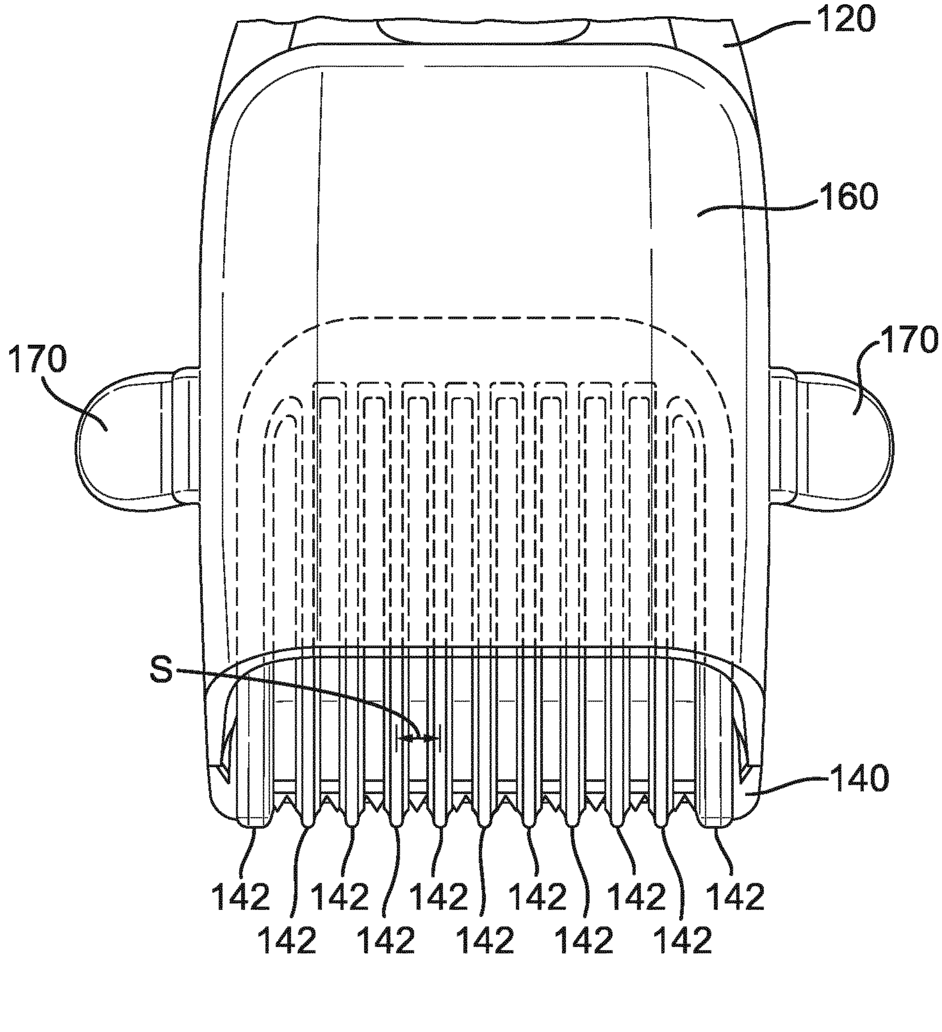
FIG. 6 is a front view of the hair cutting system, according to arrangements of the present disclosure, with hidden detail of the comb.

As depicted in FIG. 6, a spacing S between the comb teeth 142 may be selected in order to improve the retention of hairs within the hair collection chamber by the comb teeth 142, e.g. by restricting the flow of hairs between the comb teeth 142. As depicted, the spacing between the comb teeth may be less than or equal to 6.8 mm, less than or equal to 6 mm, less than or equal to 5 mm, less than or equal to 4 mm or less than or equal to mm. The spacing between the comb teeth may be greater than or equal to 1 mm, greater than or equal to 2 mm, or greater than or equal to 3 mm. For example, the spacing between the comb teeth 142 may be approximately 3.8 mm. In other arrangements, the spacing between the comb teeth 142 may be between approximately 6.8 mm and approximately 1 mm.

Returning to FIGS. 4 and 5, the front wall 164 of the hair collector 160 extends from the base wall 162 over and forwards of the distal end 140*a* of the comb 140, e.g. in the cutting direction C. The front wall 164 is shaped such that, as the comb 140 moves relative to the hair cutting appliance 120, e.g. between the retracted and extended positions, a clearance 150 between the distal end 140*a* of the comb 140, e.g. the connecting bar 148, and the front wall 164 of the hair collector remains substantially constant.

In other arrangements, the front wall 164 may be shaped such that, as the comb 140 moves relative to the hair cutting appliance 120, the clearance 150 varies, e.g. within a range of clearance values. A maximum clearance value of the range may be selected such that cut hairs are restricted from passing between the distal end 140*a* of the comb and the front wall 164 when the clearance 150 is at the maximum value. A minimum clearance value of the range may be selected in order to prevent the comb from interfering with the front wall 164 as it moves. Alternatively, the minimum clearance value may be approximately 0 mm, e.g. such that the distal end of the comb is touching the front wall 164 when the clearance 150 is at the minimum value.

The front wall 164 of the hair collector 160 may be shaped such that the front wall 164 extends over and forwards of the distal end 140*a* of the comb 140 when the comb 140 is in the retracted and extended positions, e.g. for all hair cutting lengths. In this way, the comb 140 continues to cover the opening 169 of the hair collector 160 for all hair cutting lengths.

Figure 7:
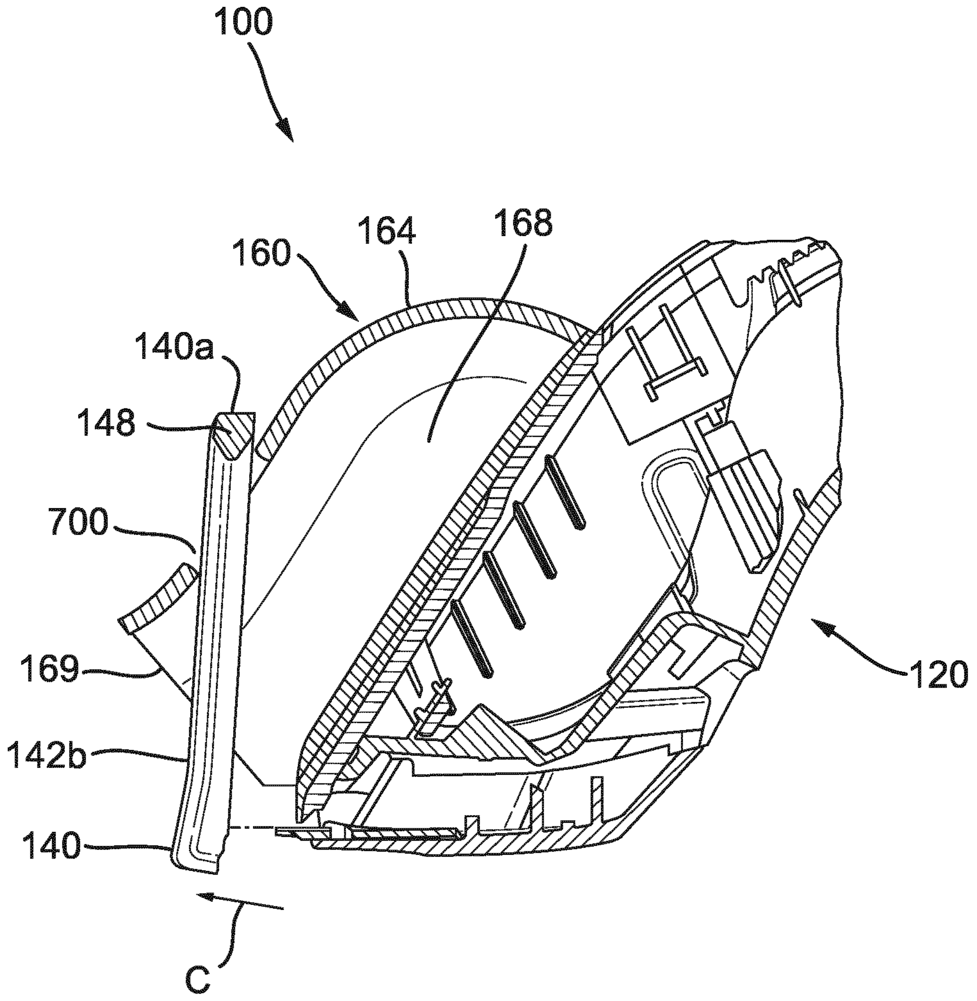
FIG. 7 is a partial sectional side view of a hair cutting system according to another arrangement of the present disclosure.

With reference to FIG. 7, in alternative arrangements, the front wall 164 of the hair collector may comprise an aperture 700, when the hair collector 160 is coupled to the hair cutting appliance 120, the distal end 140*a* of the comb 140 may extend into or through the aperture 700. Hence, no gap may be present between the front wall 164 and the comb 140, e.g. in a direction perpendicular to the inside surface of the front wall 164, though which hairs can pass out of the hair collection chamber 168.

In such arrangements, the length of the comb teeth 142, e.g. the second portions 142*b* of the comb teeth, may be selected such that the comb teeth 142 and/or connecting bar 148 extend into or through the aperture 700 when the comb 140 is in the retracted and extended positions, e.g. for all hair cutting lengths.

Figure 8:
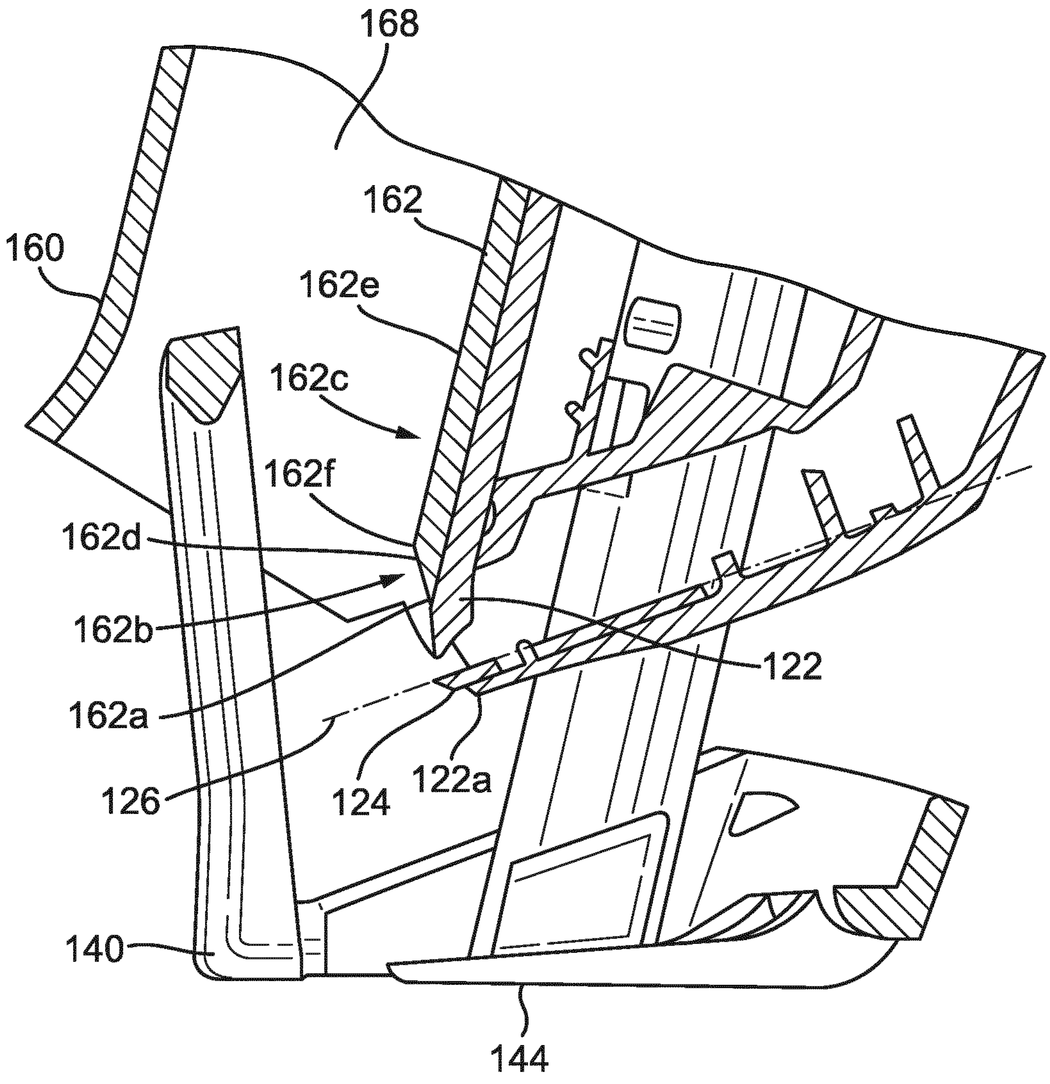
FIG. 8 is a partial sectional side view of the hair cutting system.

With reference to FIG. 8, a ramped portion 162*b* of the base wall 162 may be formed adjacent to the free edge 162*a* of the base wall 162. The ramped portion 162*b* may comprise a portion of the base wall 162 over which the thickness of the base wall tapers from a wall thickness, away from the free edge 162*a*, to an edge thickness at the free edge 162*a* of the base wall. The edge thickness may be less than the wall thickness.

An inside surface 162*d* of the ramped portion 162*b* of the base wall 162, which may be referred to as a hair flow surface, may be substantially perpendicular to the cutting plane 126 and/or the comb surface 144. Arranging the inside surface 162*d* of the ramped portion 162*b* in this way improves the flow of hair into the hair collection chamber 168 over the base wall 162.

The inside surface 162*e* of a wall portion 162*c* of the base wall on an opposite side of the ramped portion 162*b* to the free edge 162*a* may be aligned with, e.g. substantially parallel with, the body 122 of the hair cutting appliance 120, e.g. the outer surface of the body 122 adjacent to the hair collector 160.

The inside surface 162*e* of the wall portion 162*c* may by angled relative to the inside surface 162*d* of the ramped portion 162*b*. The base wall 162 may comprise a corner portion 162*f* between the ramped portion 162*b* and the wall portion 162*c*. The orientation of the inside surface of the base wall 162 may change at the corner portion 162*f*, e.g. from the orientation of the ramped portion inside surface 162*d* to the orientation of the wall portion inside surface 162*e*. As depicted, the orientation of the inside surface of the base wall 162 may change discretely or abruptly at the corner portion 162*f*.

The inside surface 162*e* of the wall portion 162*c* may be at a lower angle relative to, e.g. less perpendicular to, the hair cutting plane 126 and/or the cutting direction C. By orienting the inside surfaces of the ramped portion and the wall portion in this way, hair flow into the chamber and retention of hair within the chamber may both be improved.

Figure 9:
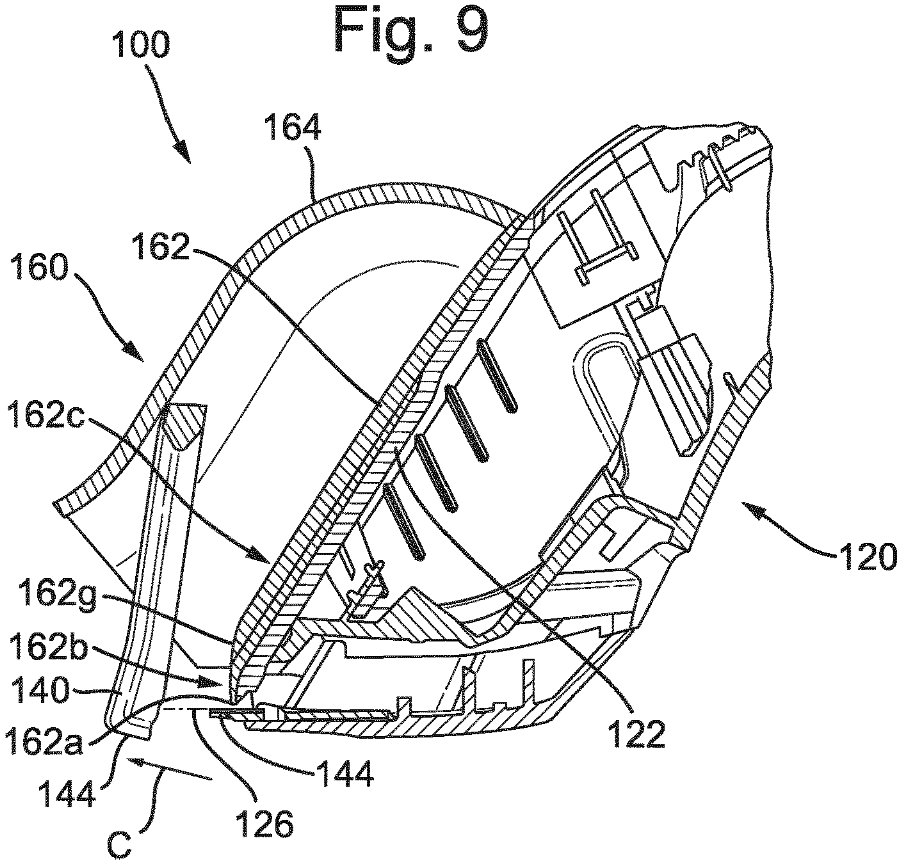
FIG. 9 is a partial sectional side view of a hair cutting system according to another arrangement of the present disclosure.

As depicted in FIG. 9, in addition to or as an alternative to the corner portion 162*f*, the base wall 162 may comprise a curved wall portion 162*g*. The orientation of the inside surface of the base wall 162 may transition over the curved wall portion 162*g* from being substantially perpendicular to the cutting plane 126 and/or the comb surface 144 at the free edge 162*a*, to being substantially aligned with, e.g. parallel with, the body 122 of the hair cutting appliance 120 away from the free edge 162*a*. The curved wall portion 162*g* may be at least partially formed by the ramped portion 162*b*. Additionally or alternatively, the curved wall portion 162*g* may be at least partially formed by the wall portion 162*c*.

Figure 10:
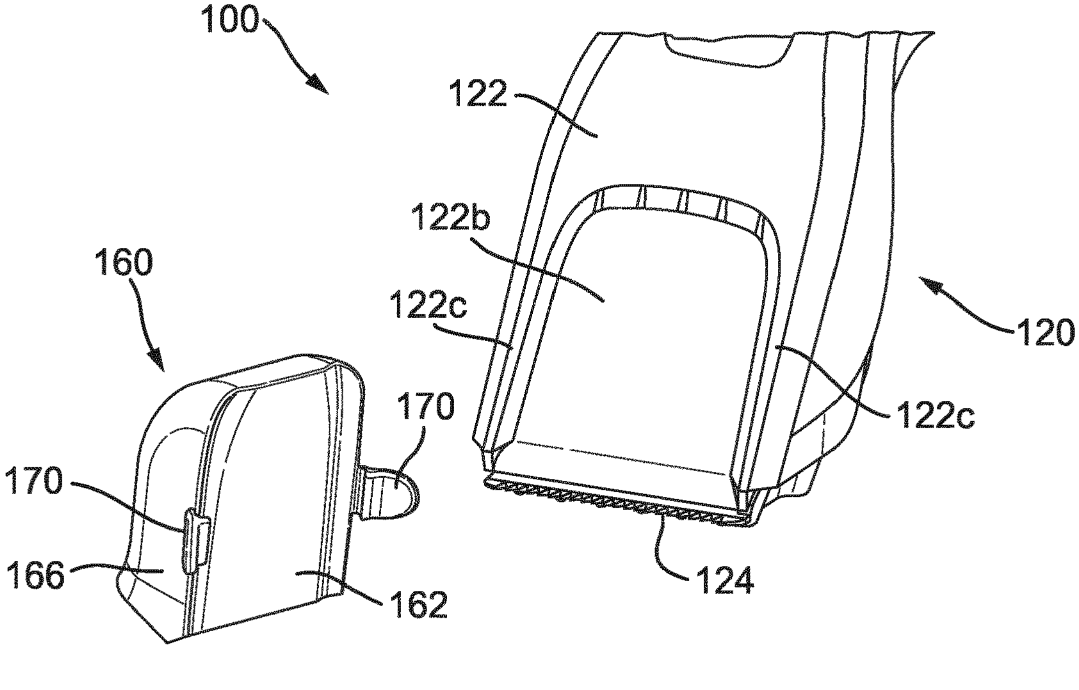
FIG. 10 is a front perspective view a hair cutting system, according to another arrangement of the present disclosure, in a disassembled condition.

With reference to FIG. 10, the body 122 of the hair cutting appliance 120 may comprise a recess 122*b*. The recess 122*b* may be configured to receive a portion of the hair collector 160 when the hair collector is coupled to the hair cutting appliance 120. For example, the base wall 162 of the hair collector 160 may be received within the recess 122*b*. A depth of the recess 122*b* may be substantially equal to a thickness, e.g. a maximum thickness, of the base wall 162. In this way, the inside surface of the base wall 162 may be substantially aligned within the outer surface 122*c* of the body 122 around the recess 122*b*. In other words, the inside surface of the base wall 162 may be disposed where the outer surface of the body 122 would be if the recess 122*b* was not provided in the body 122.

Figure 11:
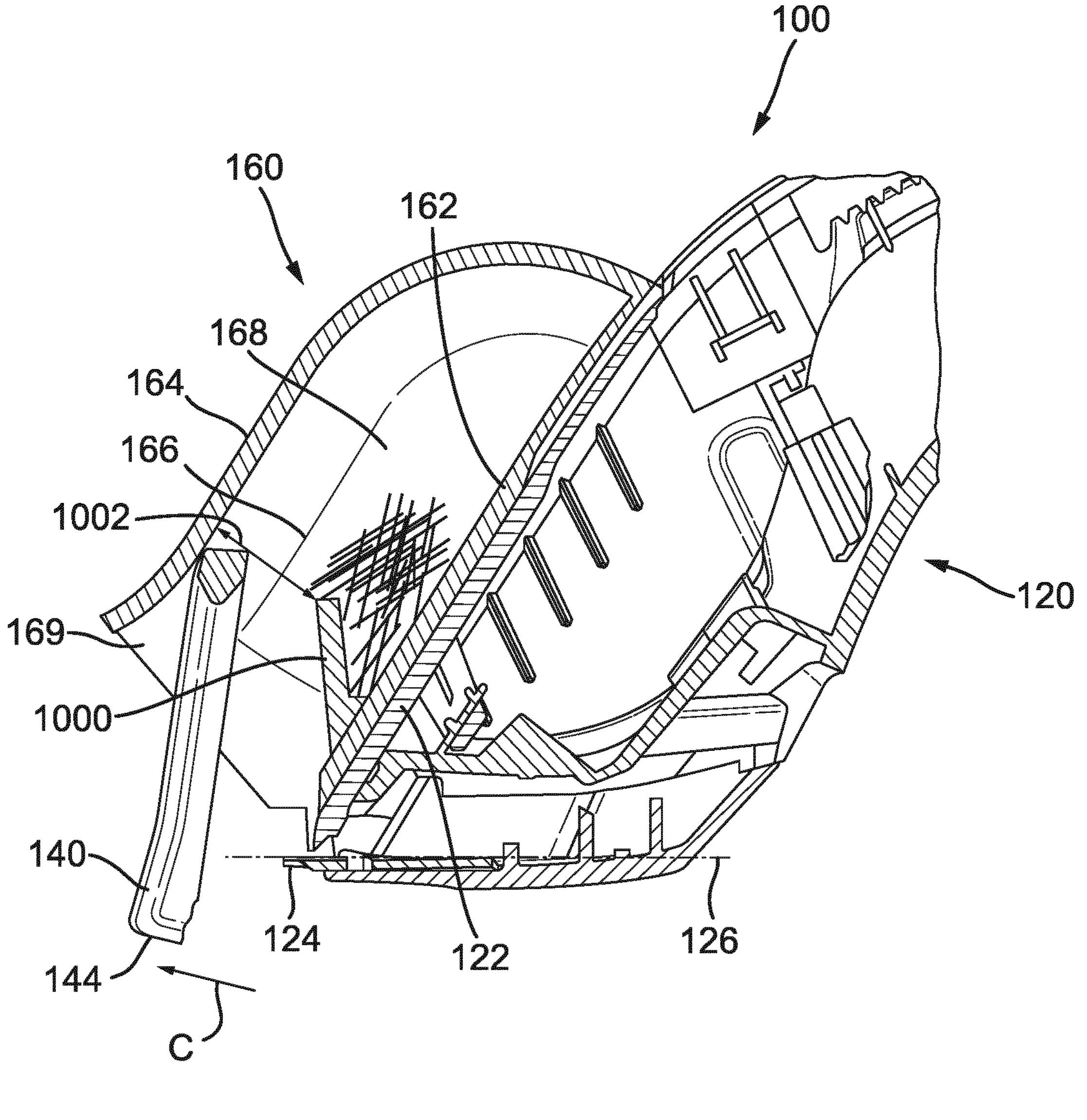
FIG. 11 is a sectional side view of a hair cutting system according to another arrangement of the present disclosure.

With reference to FIG. 11, the hair collector 160 may further comprise a hair retaining wall 1000. The hair retaining wall 1000 may extend from the base wall 162 into the hair collection chamber 168. The hair retaining wall 1000 is arranged between the closed end of the hair collection chamber 168 and the opening 169. The hair retaining wall 1000 may extend across the lateral width of the hair collection chamber 168, e.g. between the side walls 166. A hair gap 1002 may remain between the hair retaining wall 1000 and the front wall 164 of the hair collector 160 to allow hairs to move past the hair retaining wall 1000 towards the closed end of the hair collection chamber 168. As depicted in FIG. 11, cut hairs may be retained by the wall 1000, e.g. between the wall 1000 and the closed end of the hair collection chamber 168.

As depicted, the hair retaining wall 1000 may extend from the base wall 162 in a direction with a component perpendicular to the cutting plane 126, the cutting direction C and/or the comb surface 144. For example, the hair retaining wall 1000 may extend away from the base wall 162 in a direction substantially perpendicular to the cutting plane 126. When the hair retaining wall 1000 is oriented in this way, the hair retaining wall 1000 may be particularly effective in retaining hairs within the hair collection chamber 168 when the hair cutting system 100 is being used on a substantially horizontal surface, such as the top of a person's head.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

The invention claimed is:

1. A hair cutting system comprising:

a hair cutting appliance comprising one or more pairs of cutting blades for cutting hair;

a comb arranged forwards of the cutting blades and configured to guide hair towards the cutting blades;

a hair collector, the hair collector comprising a hair chamber for receiving hairs cut by the hair cutting appliance and a coupling portion configured to couple the hair collector to the hair cutting appliance;

wherein the hair chamber is defined by a base wall positioned adjacent to a body of the hair cutting appliance, a front wall opposite the base wall, and two or more side walls between the base wall and the front wall;

wherein, when the hair cutting system is assembled, a portion of the comb protrudes into the hair chamber;

wherein the portion of the comb protruding into the hair chamber comprises a plurality of comb teeth, and wherein the front wall at least partially extends over and forwards of the plurality of comb teeth in a cutting direction when the hair cutting system is assembled and used to cut hair;

wherein, the hair collector is capable of being coupled to the hair cutting appliance via the coupling portion when the comb is removed; and wherein the comb is movable relative to the cutting blades to vary the length of hair cut by the hair cutting system such that the hair chamber remains in a same position relative to the one or more pairs of cutting blades as the comb is moved relative to the cutting blades.

2. The hair cutting system of claim 1, wherein a wall of the hair chamber comprises an aperture, wherein a distal end of the comb extends into or through the aperture.

3. The hair cutting system of claim 1, wherein an opening of the hair chamber for receiving hair is substantially closed by the cutting blades and the comb.

4. The hair cutting system of claim 1, wherein a spacing between the comb teeth is between 1 mm and 6.8 mm, in order to restrict hairs from passing out of the hair chamber between the teeth of the comb.

5. The hair cutting system of claim 1, wherein the base wall is configured to engage a surface of the body of the hair cutting appliance when the hair collector is coupled to the hair cutting appliance, wherein a free edge of the base wall at least partially defines an opening of the hair chamber.

6. The hair cutting system of claim 5, wherein the hair cutting appliance comprises a recess configured to receive at least a portion of the base wall of the hair collector.

7. The hair cutting system of claim 5, wherein an inside surface of the base wall is oriented substantially perpendicularly to a hair cutting plane of the hair cutting appliance at the free edge, and is substantially aligned with the surface of the body of the hair cutting appliance at a position away from the free edge.

8. The hair cutting system according to claim 5, wherein the free edge of the base wall is substantially aligned with a distal end of the body of the hair cutting appliance.

9. The hair cutting system of claim 1, wherein the base wall comprises a curved wall portion, wherein the orientation of the base wall transitions over the curved wall portion from being substantially perpendicular to a hair cutting plane at the free edge, to being substantially aligned with the surface of the hair cutting appliance body away from the free edge.

10. The hair cutting system of claim 5, wherein the base wall comprises a ramped portion extended from the free edge, the ramped portion defining a hair flow surface substantially perpendicular to a hair cutting plane of cutting blades.

11. The hair cutting system of claim 1, wherein the comb and hair collector are configured such that a clearance between a distal end of the comb and an inside surface of the hair chamber is substantially constant as the comb moves.

12. The hair cutting system of claim 1, wherein the hair collector further comprises a hair retaining wall between a closed end of the hair chamber and an opening of the hair chamber.

13. The hair cutting system of claim 12, wherein the hair retaining wall extends away from the base wall in a direction substantially perpendicular to the hair cutting plane of the cutting blades.

* * * * *